United States Patent [19]

Grimm et al.

[11] Patent Number: 4,480,733
[45] Date of Patent: Nov. 6, 1984

[54] ENERGY ABSORBING BIDIRECTIONAL RATCHET NO-BACK APPARATUS

[75] Inventors: Duane H. Grimm; William J. Michaels, both of Rockford, Ill.

[73] Assignee: Sundstrand Corporation, Rockford, Ill.

[21] Appl. No.: 260,483

[22] Filed: May 4, 1981

[51] Int. Cl.³ .............................................. B60T 7/12
[52] U.S. Cl. .................................................. 192/8 R
[58] Field of Search ................................... 192/8 R, 7

[56] References Cited

U.S. PATENT DOCUMENTS

| | | | |
|---|---|---|---|
| 1,833,224 | 11/1931 | Mullan et al. | 192/8 R |
| 2,094,163 | 9/1937 | Weber | 192/8 R |
| 2,240,043 | 4/1941 | Kinser | 192/8 R |
| 3,285,377 | 11/1966 | Rasmussen | 192/8 R |
| 3,596,740 | 8/1971 | Nau | 192/8 R |
| 3,976,172 | 8/1976 | Geppert | 192/8 R |
| 3,976,173 | 8/1976 | Spencer | 192/8 R |

*Primary Examiner*—George H. Krizmanich
*Attorney, Agent, or Firm*—Harold A. Williamson; Ted E. Killingsworth; Michael B. McMurry

[57] ABSTRACT

This invention relates to an energy absorbing ratchet for a bidirectional no-back apparatus which includes in combination a fixed support, a rotatable input member and a rotatable output member. The input member includes an input plate which has integral therewith a pair of release pins. An output plate is coupled to the output member. The input plate and the output plate have a torque transmission device coupled therebetween. The fixed support has an energy absorbing means coupled to a ratchet ring. The ratchet ring is positioned between the input and the output plate. The output plate has thereon a pair of moveably mounted pawl members for cooperative engagement with the ratchet ring to thereby engage the ratchet ring when the no-back apparatus is at rest, and whenever a backdriving load is delivered from the output member to the output plate. The pawl members are released from the ratchet ring by the cooperative engagement with the release pins upon bidirectional rotation of the input member.

12 Claims, 11 Drawing Figures

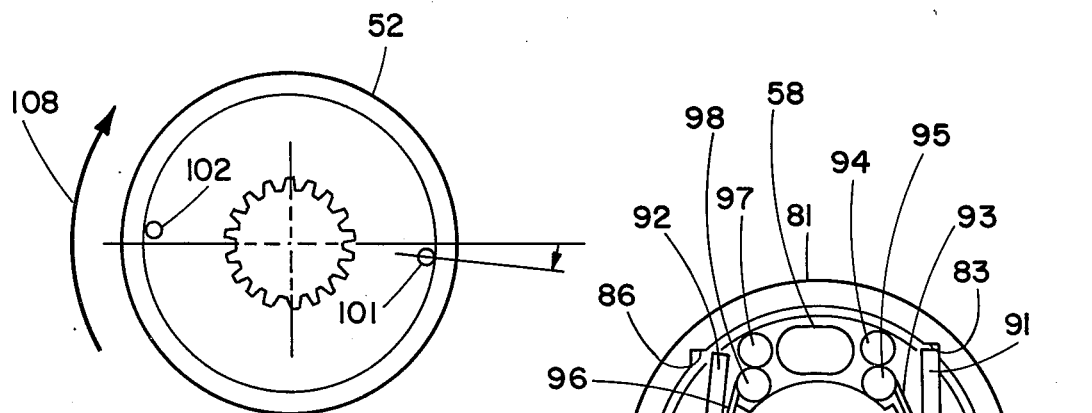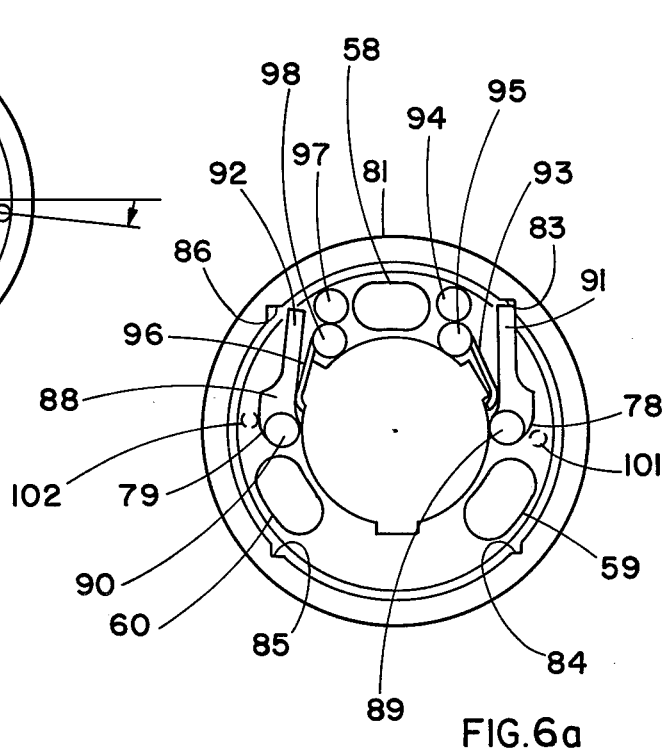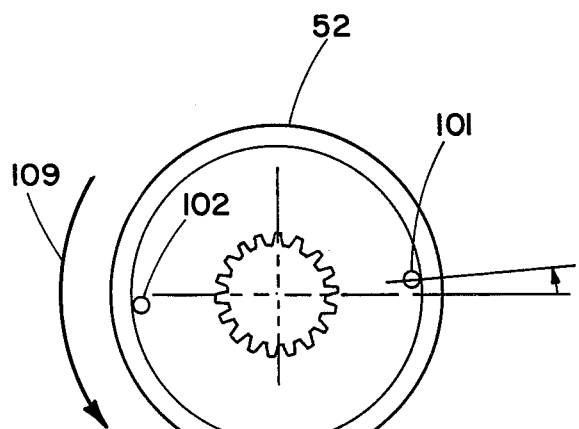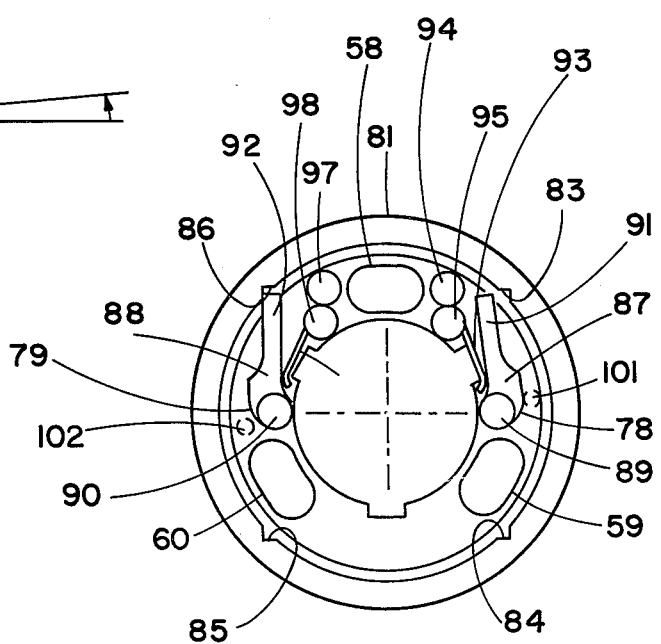
FIG. 6
FIG. 6a
FIG. 7
FIG. 7a

ENERGY ABSORBING BIDIRECTIONAL RATCHET NO-BACK APPARATUS

TECHNICAL FIELD

This invention relates to an apparatus to prevent reverse power flow in an actuator mechanism.

BACKGROUND ART

In aircraft actuation systems it has been conventional to employ some type of no-back apparatus to prevent aerodynamic loads from moving flight surfaces due to loss of torque reaction in case of failure of the drive train.

Historically two basic kinds of no-back apparatus are employed. They are the friction type and the ratchet type. Both of these no-back apparatus have advantages as well as inherent limitations. The friction type is quite reliable but tends to be relatively large, heavy and generally inefficient. The ratchet type no-back apparatus is compact and lightweight, but has been limited to applications with low inertia and rotational speed, because there is no inherent ability to dissipate energy.

It should, of course, be recognized that there have been mechanical movements that have been designed to permit power to be delivered into a shaft in either direction of rotation and to prevent such rotation when power is not so being delivered. These mechanical movements find utility in such environments as automobiles where they are incorporated in the power line shaft and adapted to act as an automatic brake which is rendered operative when the engine is retarding the automobile and inoperative when the engine is propelling the automobile.

The Mullan et al U.S. Pat. No. 1,833,224 ('224) illustrates a mechanical movement that is representative of this just mentioned type of arrangement. The '224 patent teaches the use of a differentially actuated brake which operates as a consequence of a driving shaft 10 having a threaded end portion cooperating with a nut 12 which is secured for rotation with a driven shaft 11. Friction brakes are secured to the nut 12 and depending upon the relative motion between the driving shaft 10 and the drive shaft 11, move the nut 12 and associated friction brake into and out of engagement. The '224 patent also provides for releasable bidirectional locking members 28 and 33 in the form of dogs. The '224 patent does not provide for backdriving relief in the form of energy absorbing frictional slip between the locking members 28, 33 and a fixed support as is provided in the invention to be described hereinafter.

The Rosin U.S. Pat. No. 2,240,043 ('043) is directed to an energy absorbing no-back drive mechanism suitable for use in an aircraft flap actuator drive for transmitting torque from one shaft to another which employs a load responsive clutch and a unidirection or no-back locking mechanism to minimize oscilation and chatter from the feed back torque of a load. The '043 patent does not teach the idea of having the no-back locking mechanism frictionally coupled to a housing to prove for energy absorption between the no-back locking mechanism and the housing as contemplated in the invention to be described hereinafter.

The Geppert U.S. Pat. No. 3,976,172 ('172) is directed to a ratchet no-back brake which allows essentially no obstruction to powered movement of the drive member in either direction. The '172 patent is a fair example of a ratchet no-back that is devoid of any energy absorption mechanism for the no-back brake as will be seen to be present in the subject invention to be described.

DISCLOSURE OF INVENTION

More specifically, this invention relates to an energy absorbing ratchet for a bidirectional no-back apparatus which includes in combination a fixed support, a rotatable input member and a rotatable output member. The input member includes an input plate which has integral therewith a pair of release pins. An output plate is coupled to the output member. The input plate and the output plate have a torque transmission device coupled therebetween. The fixed support has an energy absorbing means coupled to a ratchet ring. The ratchet ring is positioned between the input plate and the output plate. The output plate has thereon a pair of moveably mounted pawl members for cooperative engagement with the ratchet ring to thereby engage the ratchet ring when the no-back apparatus is at rest, and whenever a backdriving load is delivered from the output member to the output plate. The pawl members are released from the ratchet ring by the cooperative engagement with the release pins upon rotation of the input member in either direction.

It is therefore a primary object of the invention to provide an energy absorbing ratchet for a bidirectional no-back apparatus that finds utility in a mechanism used to prevent reverse power flow in an aircraft actuator.

Another object of this invention is to provide an efficient, compact and lightweight energy absorbing no-back apparatus that will survive both the forward and backward dynamic load engagements.

Yet another object of the invention is to provide a no-back apparatus having a ratchet ring which is not held rigidly in the housing of the apparatus but is clamped in place with an axial spring to thereby establish a force sufficient to provide enough friction torque at the ring/housing interface to react normal backdriving loads. The spring force is controlled or set so that extreme loads such as inertia torque reaction that would occur during a dynamic engagement are limited to levels that no-back components can withstand without damage.

In the attainment of the foregoing object, the invention contemplates that the energy absorbing ratchet bidirectional no-back apparatus include in combination a fixed housing, a rotatable input member and a rotatable output member.

The input member includes a flat annular input plate having integral therewith a pair of spaced apart release pins parallel to the axis of rotation of the input member.

The output member has coupled thereto a flat annular output plate mounted for rotation about the axis of rotation of the input member. The output plate is biased towards the input plate. The input plate and the output plate have a torque transmission means coupling the plates. The torque transmission means takes the form of balls disposed between the input plate and output plate, which balls cooperating with ball ramps on the face of the input and output plates.

The housing has therein a frictionally mounted resiliently biased ratchet ring slideably secured to the housing and positioned between the input plate and output plate. The ratchet ring has a notched internal surface.

The output plate has thereon, a pair of pivotally mounted pawl members each having a ratchet ring notch engaging portion. The pawl members are resiliently biased towards the notched internal surface of the ratchet ring to thereby engage the notches on the internal surface of the ratchet ring when the apparatus is at rest, as well as whenever a backdriving load is delivered from the output member to the output plate.

The release pins of the input plate cooperate with the pawl members upon relative motion between the plates initiated by any bidirectional rotation of the input plate to thereby cause the ratchet ring notch engaging portion of one of the pawls to be withdrawn from engagement with the notches of the ratchet ring and thereby allow the input member to transmit rotation to the output member through the input plate, the torque transmitting means and the output plate.

Other objects and advantages of the present invention will be apparent upon reference to the accompanying description when taken in conjunction with the following drawings.

BEST MODE FOR CARRYING OUT THE INVENTION

Figure 1:
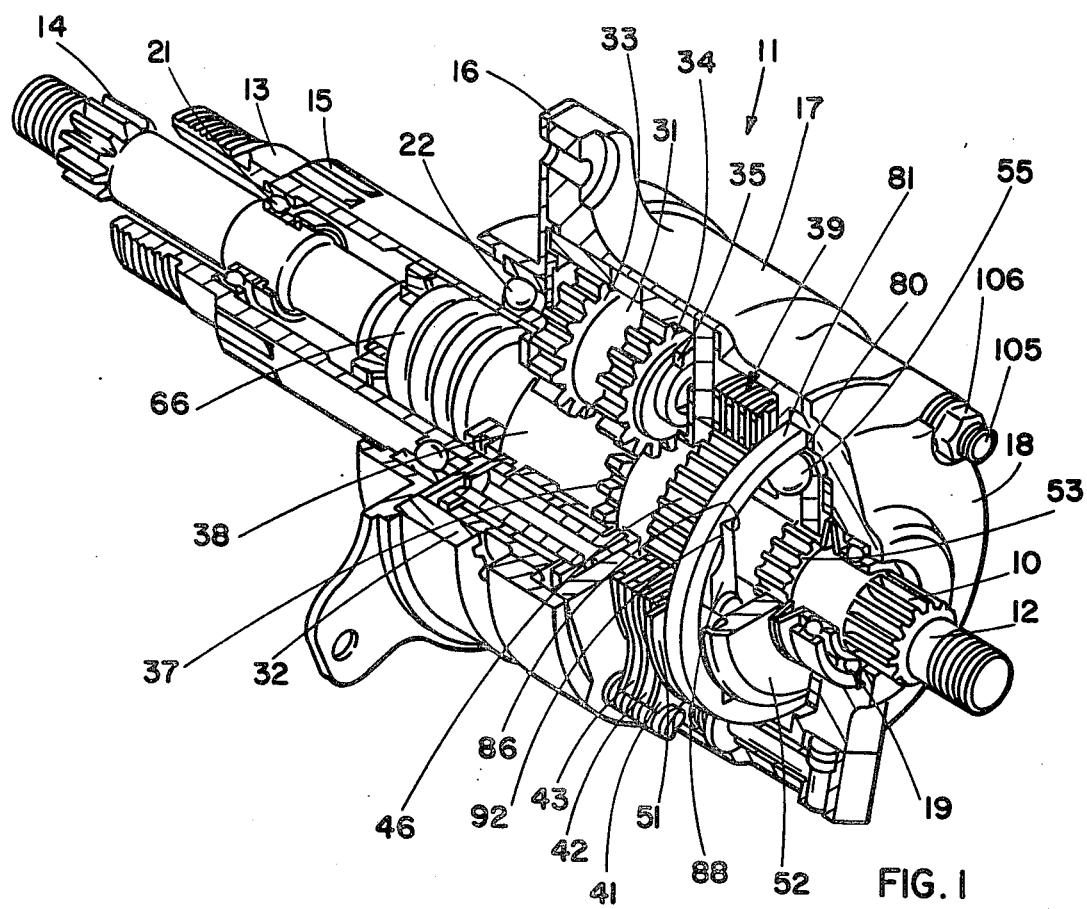
FIG. 1 is a three dimensional illustration in partial section of a rotary actuator embodying the invention.

Reference is now made to FIG. 1 which illustrates a three dimensional partial section of a rotary actuator 11 embodying the invention. The basic components of the rotary actuator 11 are an input member in the form of an input through shaft 12 and an output member in the form of concentrically mounted output shaft 13. The input shaft 12 is supported in a three part housing made up of a pair of housing end sections 16 and 18 with a central actuator housing 17 secured as shown to the housing end sections 16, 18. The input through shaft 12 is supported at one end in housing end section 18 by ball bearing 19. A ball bearing 21 is disposed at the other end of input through shaft 12 between the input shaft 12 and the output shaft 13. The output shaft 13 is supported in housing end section 16 by ball bearing 22.

Figure 2:
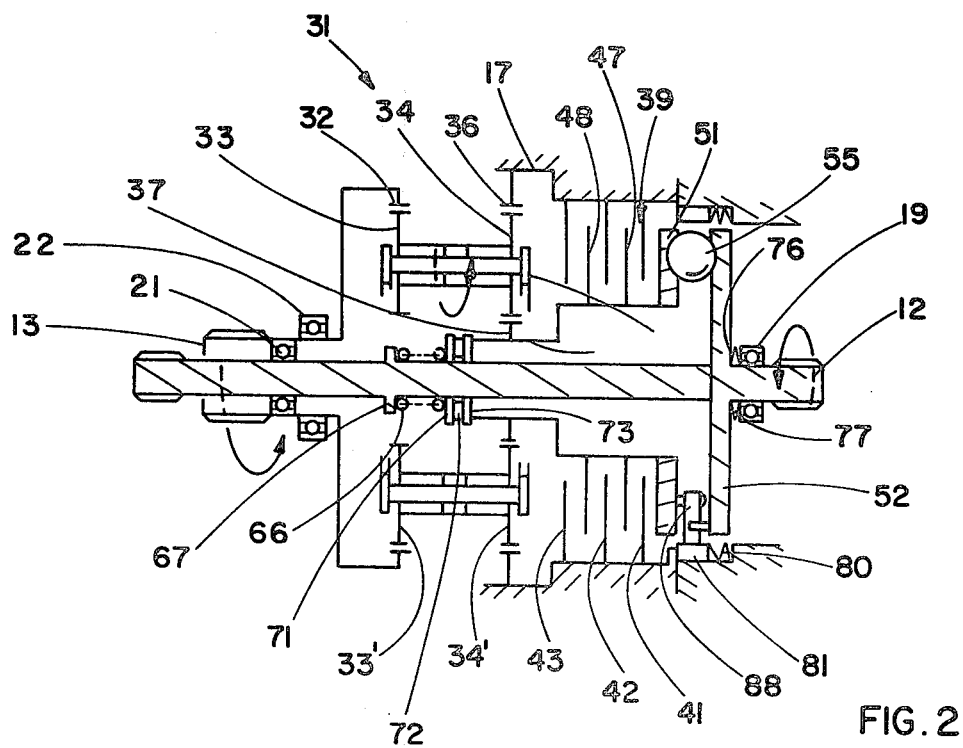
FIG. 2 is a schematic drawing of the rotary actuator of FIG. 1.

A planetary gear section 31, the details of which can best be understood by a study of the schematic of FIG. 2, couples the output shaft 13 through a ring gear 32, compound planet gears 33, 34, 33', 34' on carrier 35', fixed to housing 17 ring gear 36, and sun gear 37 secured to concentric shaft 38. The details of the differential planetary gear train do not form a part of the invention and will only be described in general terms insofar as its significance to the combination of components is concerned.

Concentric shaft 38 is connected as shown to a disc brake arrangement 39. The disc brake 39 includes brake plates not referenced and reaction plates 41, 42, 43 secured to the central housing 17 as shown in FIG. 1 and schematically illustrated in FIG. 2. A splined section 46 of concentric shaft 38 carries friction plates 47, 48. An output plate 51 is formed integrally to the splined section 46 of concentric shaft 38. An input plate 52 is shown secured to a spline 53 on the input through shaft 12. Torque transmitting means in the form of balls 55, 56, 57 (see FIG. 4), are disposed between the input plate 52 and output plate 51. Each of the plates have plurality of slightly elongated recessed regions to accomodate the balls. The elongated nature can best be observed by a study of FIGS. 5a–6a and 7a where elongated recessed regions 58, 59, 60 of the output plate 51 are illustrated. FIG. 5b illustrates in an exaggerated form the recessed region cross-section and a torque transmitting ball 55 situated on a small machined flat 61 at the bottom of ball ramps 61, 62.

Figure 5:
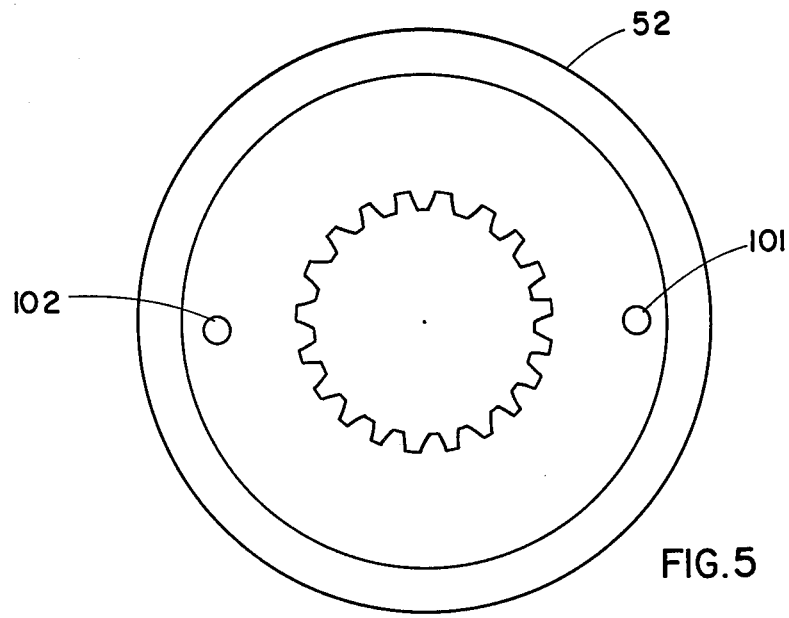
FIG. 5b is a partial section taken along the line 5b—5b in FIG. 5a, FIGS. 6 and 6a taken together depict pawl release initiated by clockwise rotation of the input, with FIG. 5 taken along the line 6—6 in FIG. 4 and FIG. 6a taken along the line 6a—6a in FIG. 4, and FIGS. 7 and 7a taken together depict pawl release initiated by counterclockwise rotation of the input.

The input plate 52 has a similar set of recessed elongated regions 58, 59, 60 shown in dotted outline in FIG. 5. The input plate 52, output plate 51 and the three balls 55, 56, 57, one of which 55 is shown in FIG. 1, form what is termed a ball ramp torque limiter actuator. Before the operation of the ball ramp torque limiter actuator is described, it should be noted that the output plate 51 is biased or preloaded towards the input plate 52 by means of a helical compression spring 66. The arrangement now to be described can best be appreciated by a study of FIGS. 2 and 3. The spring 66 abuts at one end with adjustable nut 67, which nut is fitted on a threaded portion 68 of input through shaft 12, and at the other end with shaft washer 71. The shaft washer 71 has positioned on its other side, needle thrust bearings 72 which are fitted flush against a shaft washer 73, which in turn abuts the end 74 of concentric shaft 38. It should also be observed that the preload that is transmitted from spring 66, washer 71, needle bearing 72, washer 73, concentric shaft 38, output plate 51, ball 54, and input plate 52 is resiliently opposed by bellville washer pair 76, 77 shown located between the input plate 52 and a snap ring 75 which abuts roller bearing 19 secured to the end housing 18. The bellville washer pair 76, 77 provides sufficient axial force to maintain axial running clearance during normal operation. The input plate 52 is held in its axial location with respect to the shoulder on shaft 12 formed by the spline 53. This avoids the need to transmit spring 66 preload across a rotating interface, thereby avoiding a significant loss of efficiency.

Reference is again made to FIG. 3 and FIG. 4 to facilitate a comprehension of the energy absorbing no-back ratchet arrangement of the combination.

Figure 4:
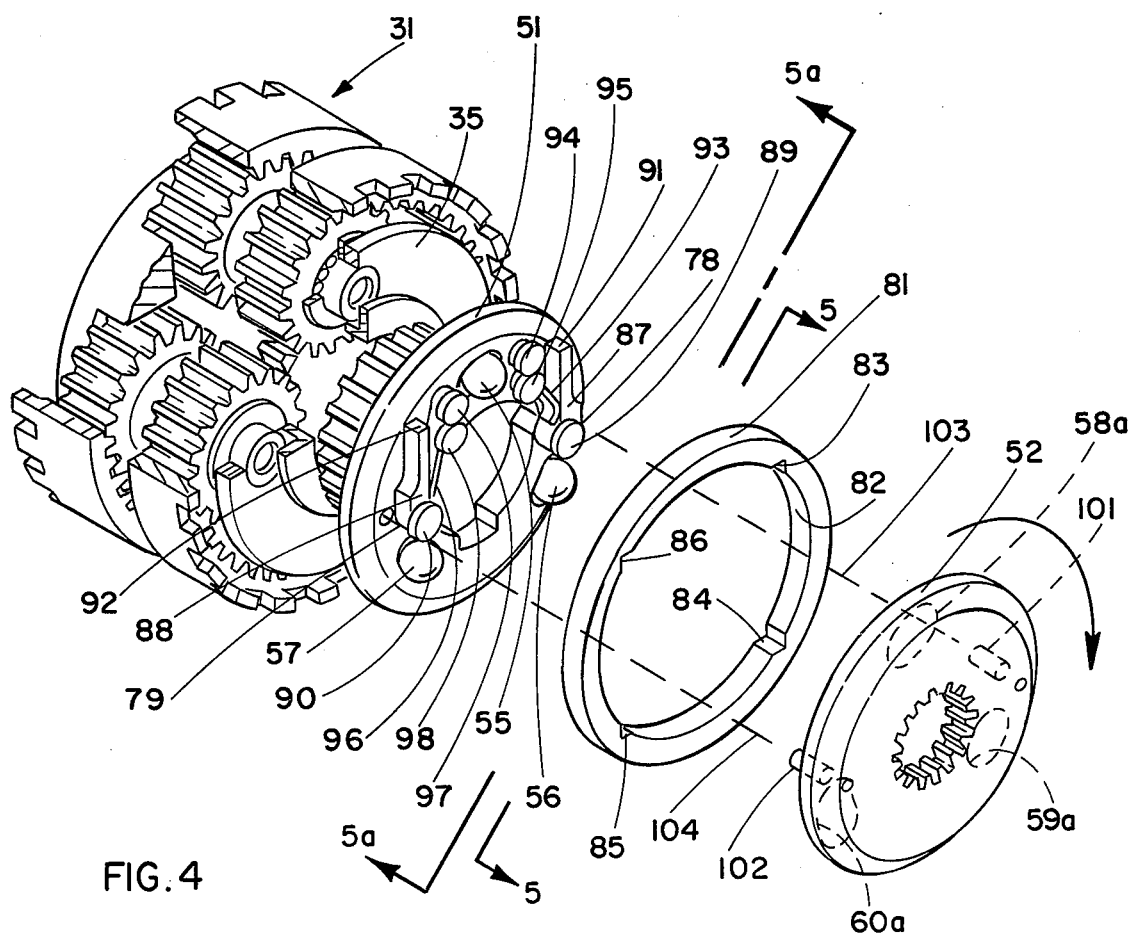
FIG. 4 is an exploded view, in three dimensional form, of a differential planetary reduction gear in combination with a no-back ratchet arrangement that involves the invention, FIGS. 5 and 5a when taken together provide a view of the ratchet pawl and ring involved in the invention when the apparatus is at rest.

In FIG. 4, the output plate 51 is shown in an exploded view to the right of planetary gear section 31. The input plate 52 is shown in its relative position, vis-a-vis, a ratchet ring 81 or ring means as it may be termed. The ratchet ring 81 has on its internal surface 82, a plurality of notches 83, 84, 85 and 86. The output plate 51 has thereon a pair of pawl members 87, 88, pivotally mounted on pins 89, 90. The pawl member 87 has a ratchet ring notch engaging portion 91 and in a like manner, the pawl member 88 has a ratchet ring notch engaging portion 92. The pawl member 87 is biased toward the ratchet ring 81 by a leaf spring 93 secured to pin 94 and flexed over pin 95. Pins 94, 95 may be secured to output plate 51 in any suitable manner. The pawl 88 is likewise biased toward ratchet ring 81 by leaf spring 96 which leaf spring 96 cooperates with pins 97, 98. Pins 97, 98 may be secured to output plate 51 in any suitable manner.

The input plate 52 has integral therewith a pair of spaced apart release pins 101, 102. The release pins 101, 102 are positioned parallel to the axis of rotation of the input through shaft 12. Broken lines 103, 104 (FIG. 4) indicate the mating engagement with pawl shoulders 78, 79 of pawl members 87, 88.

Figure 3:
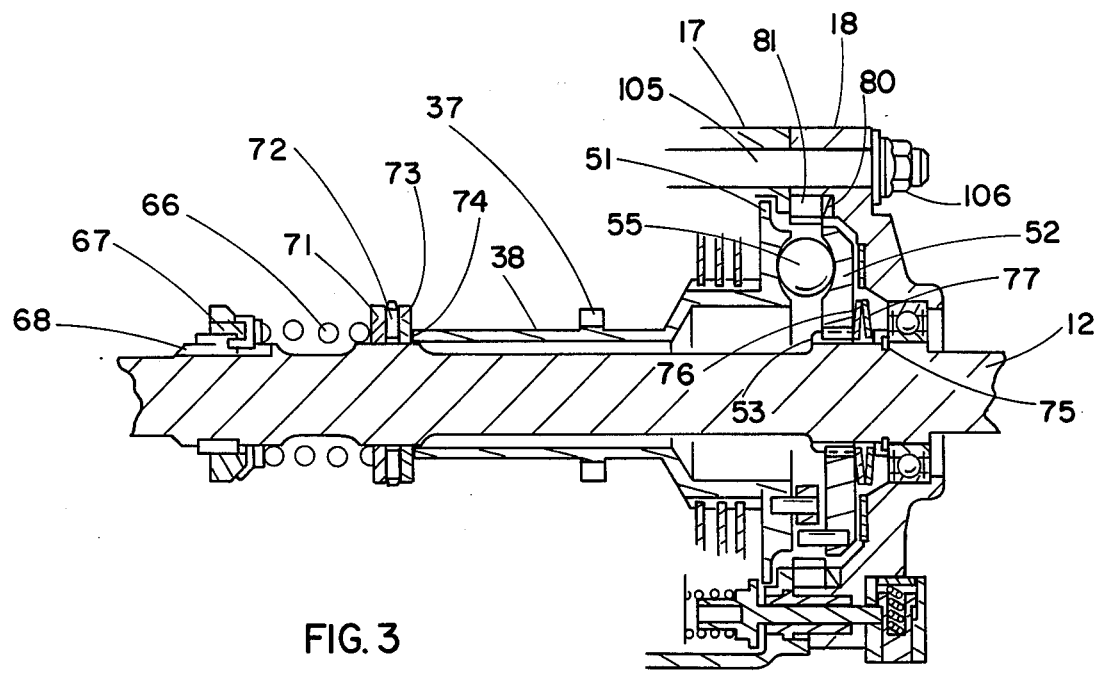
FIG. 3 is a partial cross-section of the rotary actuator of FIG. 1.

In FIG. 1 and FIG. 3, the manner in which the energy absorbing ratchet ring 81 is slideably frictionally secured between the central housing 17 and end housing 18 is shown. A wave spring washer 80 is disposed between the ratchet ring 81 and the end housing 18. Housing bolts, of which only one is shown as bolt 105 having a nut 106 threaded thereon, when torqued in place apply a resilient force through wave spring washer 80 to ratchet ring 81. In a manner to be described more fully hereinafter, the ratchet ring 81 may slide with the housing 17, 18 when sudden dynamic loads are transmitted back through the actuator 11 from the output shaft 13.

Figure 5A:
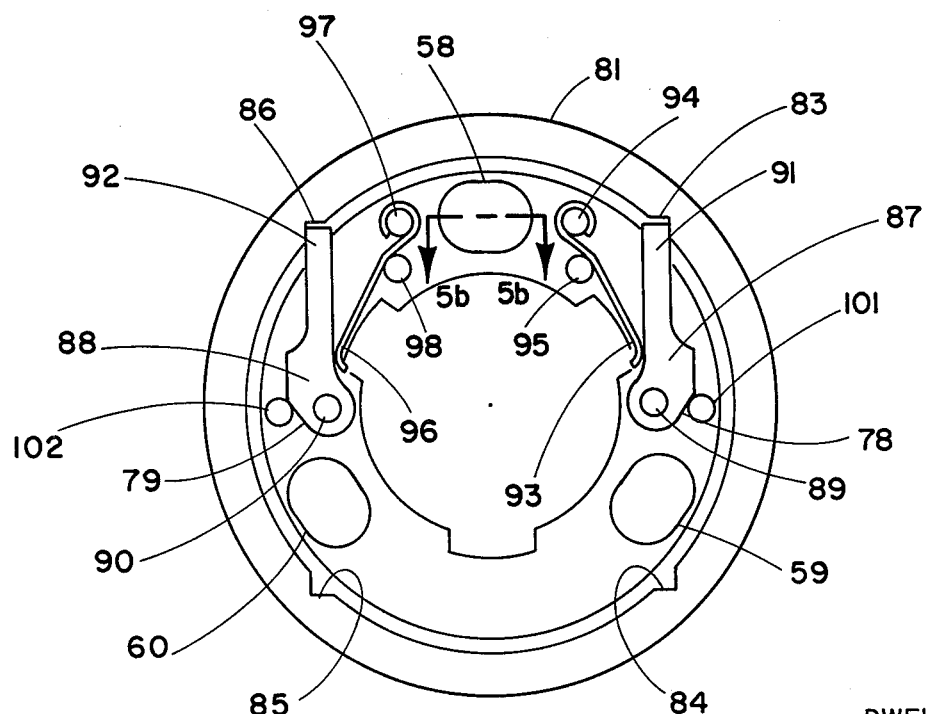
Figure 5B:
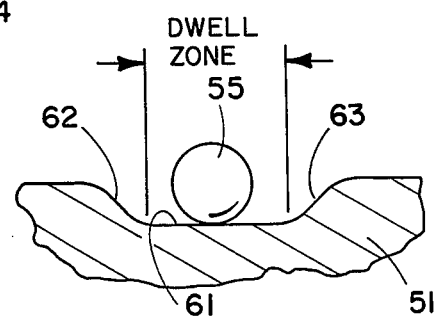

Reference is now made to the series of FIGS. 5, 5a; 6, 6a and 7, 7a, which are intended to graphically convey the manner in which the input plate 52, pins 101, 102 cooperate with the shoulders 78, 79 of pawls 87, 88, and output plate 51 during various modes of operation.

FIG. 5 illustrates the input plate 54 and the position of pins 101, 102 with the apparatus at rest. FIG. 5a shows the pins 101, 102 in broken line in a neutral abutting relationship with shoulders 78, 79 of pawls 87, 88. The notch engaging end sections 91, 92 of pawls 87, 88 are shown in engagement with notches 83 and 86 of ratchet ring 81.

FIG. 6 and FIG. 6a when studied together, depict what occurs when the input plate 52 moves in a clockwise direction as indicated by arrow 108. In FIG. 5a it can be seen that this clockwise movement causes pawl 88 to be freed from the notch 86. Further movement of the input plate 52 will cause pawl 87 to be freely drawn from notch 83 and move along the inner surface 82 of ratchet ring 81.

FIG. 6 and FIG. 6a depict pawl 87 being freed from notch 83 during counterclockwise rotation.

GENERAL OPERATION

In the review that follows, the details of FIG. 1 will assist the reader in following the operation described.

Input torque and directional rotation are transmitted into the actuator 11 by means of the spline 10 on the input through shaft 12. Most of the torque input is carried down the center of the actuator 11 by the input through shaft 12. This torque is transmitted to additional aircraft shafting by the mating output spline 14 on the opposite end of the input through shaft 12. A portion of the input torque is removed from the input through shaft 12 and used to perform work culminating in movement of the aircraft slats (not shown). This torque is removed by means of a spline 53 on the input through shaft 12, which is attached to the input plate 52 of ball ramp torque limiter. Under normal operation this input torque rotates the three balls 55, 56 and 57 in the torque limiter along a small machined flat such as flat 61, FIG. 5b at the bottom of ball ramps 62, 63. This transfers torque to the output plate 51 of the torque limiter. Rotation of the input plate 52 allows either pin 101, 102 secured to the input plate 52 to depress either of the spring loaded pawls 87, 88 out of its no-back detent position. Under normal load conditions, the balls will not travel up the ramp, but will transmit torque to the output plate 51 of the torque limiter. The output plate 51 is integrally connected to the sun gear 37 by concentric shaft 38. Rotation of the output plate 51 transmits the input torque to the planetary. The sun gear torque is transmitted to the planet carrier 35 through the planet gears 33, 34 and 33', 34'. The input side of these planet gears 34, 34' react against a fixed ring gear 36, which results in movement of this carrier 35 around the actuator centerline as a result of carrier torque. The output side of the planet gears 33, 33' then transmit torque to the output shaft 13. The output shaft 13 is connected to the driven system through integral splines 15 on the output shaft 13.

During an overload or jam condition, the balls 55, 56, 57 in the torque limiter would climb the ramp, i.e., FIG. 5b ramp 62 or ramp 63, as the preload induced by helical compression spring 66 is overcome. The travel of the balls up the ramp results in translation of the output plate 51 towards the not referenced brake plates of disc brake 39. As the rotating brake plates of disc brake 39 contact the stationary brake plates 41, 42 and 43, the increasing torque on the output plate 51 is grounded to the actuator housing 17 and to the aircraft structure. The connection of housing 17 and the aircraft structure is not shown. At this point, all additional input torque is reacted into the housing 17, thereby limiting the output actuator torque.

In the event the drive shafting is broken or, for other reasons, does not react against a backdriving load, the normal inefficiency of the planetary system will prevent backdriving. If the inefficiency is not adequate to sustain the aiding load, as would occur in a vibratory operating mode, the actuator 11 provides for the reaction of any backdriving load through the energy absorbing arrangement of the pawls 87, 88 and friction mounted ratchet ring 81.

From the foregoing description it can be appreciated that the invention described uniquely provides an energy absorbing ratchet for a bidirectional no-back apparatus that finds special utility in a mechanism that prevents reverse power flow in an aircraft actuator. The apparatus just described is an efficient, compact and lightweight energy absorbing no-back apparatus that will survive both forward and backward dynamic load engagement. Especially significant to the invention has been the description of the provision of a no-back apparatus that has a ratchet ring which is not held rigidly in the housing of the actuator, but is clamped in place with an axial spring to thereby establish a force sufficient to provide enough friction torque at the ring/housing interface to react normal backdriving loads. The spring force is selected so that extreme loads such as inertia torque reaction that would occur during a dynamic engagement are limited to levels that no-back components can withstand without damage.

Although this invention has been illustrated and described in connection with the particular embodiment illustrated, it will be apparent to those skilled in the art that various changes may be made therein without departing from the spirit of the invention as set forth in the appended claims.

I claim:

1. An energy absorbing bi-directional no-back apparatus including in combination:

a fixed support, a rotatable input member and a rotatable output member, said input member including an input plate having integral therewith a pair of release pins, an output plate coupled to said output member, said input plate and said output plate having a torque transmission means coupled therebetween, said fixed support having an energy absorbing ring means positioned between said input and said output plate, said output plate having thereon, a pair of moveably mounted pawl members biased towards said energy absorbing ring means for cooperative engagement with said energy absorbing ring means to thereby engage said energy absorbing ring means when said apparatus is at rest, said pair of release pins positioned adjacent said pawl members such that whenever a backdriving load is delivered from said output member to said output plate, said pawl members are released from said energy absorbing ring means by cooperative engagement with said release pins upon bidirectional rotation of said input member.

2. The apparatus of claim 1 wherein said fixed support is a housing surrounding at least said input and output plate.

3. The apparatus of claim 2 wherein said input plate has a flat annular configuration and said pair of release pins are spaced apart and parallel to the axis of rotation of said input member.

4. The apparatus of claim 3 wherein said output plate has a flat annular configuration and is mounted for rotation in said housing about said axis of rotation of said input member.

5. The apparatus of claim 4 wherein said output plate is preloaded towards said input plate and there is provided between said input plate and said housing a resilient means to thereby provide a sufficient axial force to maintain axial running clearance during normal operation.

6. The apparatus of claim 4 wherein said energy adsorbing ring means is a frictionally mounted ratchet ring slideably secured to said housing.

7. The apparatus of claim 6 wherein said frictionally mounted ratchet ring has a notched internal surface.

8. The apparatus of claim 7 wherein said moveably mounted pawl members are pivotally secured to said output plate and each have a ratchet ring notch engaging portion thereof resiliently biased towards said notched internal surface of said ratchet ring, said ratchet ring notch engaging portions engaging said notches on said internal surface.

9. The apparatus of claim 8 wherein said release pins of said input plate cooperating with said pawl members upon relative motion between said plates initiated by bidirectional rotation of said input plate to thereby cause said notch engaging ratchet ring portion of one of said pawls to be withdrawn from engagement with said notches and allow said input member to transmit rotation to said output member through said input plate, said torque transmitting means and said output plate.

10. The apparatus of claim 9 wherein said torque transmitting means includes a ball means position between said input and output plate and said input and output plates have indented ball ramp regions cooperating with said ball means on the sides of said input and output plates facing each other, and said output plate having coupled thereto a disc brake, ball ramp actuated torque limiting means.

11. The apparatus of claim 10 wherein said output plate is coupled through a differential planetary reduction means to said output member.

12. An energy absorbing bidirectional no-back apparatus including in combination:

a fixed support, a rotatable input member and a rotatable output member, said input member including an input plate having integral therewith a pair of release pins, an output plate coupled to said output member, said input plate and said output plate having a torque transmission means coupled therebetween, said fixed support having an energy absorbing ratchet ring means frictionally secured to said fixed support, said ratchet ring means positioned between said input and said output plate, said frictionally secured ratchet means having a notched internal surface, said output plate having thereon, a pair of moveably mounted pawl members biased for cooperative engagement with said notched internal surface of said frictionally secuured ratchet ring means to thereby engage said notched internal surface of said ratchet ring means when said apparatus is at rest, and whenever a backdriving load is delivered from said output member to said output plate, said pawl members to be released from said notched ratchet ring means by cooperative engagement with said release pins upon rotation of said input member in either direction.

* * * * *